(12) United States Patent
Ohno et al.

(10) Patent No.: US 7,258,185 B2
(45) Date of Patent: Aug. 21, 2007

(54) DRIVE POWER TRANSMISSION EQUIPMENT

(75) Inventors: Akihiro Ohno, Okazaki (JP); Tsuyoshi Murakami, Handa (JP); Akira Kodama, Chiryu (JP)

(73) Assignee: JTEKT Corporation, Osaka (JP)

( * ) Notice: Subject to any disclaimer, the term of this patent is extended or adjusted under 35 U.S.C. 154(b) by 521 days.

(21) Appl. No.: 10/498,019

(22) PCT Filed: Apr. 23, 2003

(86) PCT No.: PCT/JP03/05134

§ 371 (c)(1),
(2), (4) Date: Jun. 16, 2004

(87) PCT Pub. No.: WO03/091056

PCT Pub. Date: Nov. 6, 2003

(65) Prior Publication Data

US 2005/0103552 A1 May 19, 2005

(30) Foreign Application Priority Data

Apr. 26, 2002 (JP) ............................ 2002-126692

(51) Int. Cl.
*B60K 28/16* (2006.01)
*B60K 17/348* (2006.01)
(52) U.S. Cl. .................... 180/197; 180/248; 701/69
(58) Field of Classification Search ............... 180/197, 180/233, 248; 701/67, 69, 88, 89; 477/35
See application file for complete search history.

(56) References Cited

U.S. PATENT DOCUMENTS

| | | | |
|---|---|---|---|
| 4,702,341 A * | 10/1987 | Taga et al. ................. 180/249 |
| 5,701,247 A * | 12/1997 | Sasaki ........................... 701/1 |
| 5,803,197 A * | 9/1998 | Hara et al. ................... 180/248 |
| 5,927,425 A * | 7/1999 | Kusano ....................... 180/248 |
| 5,947,224 A | 9/1999 | Kouno |
| 6,189,642 B1 | 2/2001 | Kusano |
| 6,575,261 B2 * | 6/2003 | Mori et al. .................. 180/248 |
| 6,823,252 B2 * | 11/2004 | Ito et al. ........................ 701/82 |
| 6,842,681 B2 * | 1/2005 | Imai et al. ..................... 701/69 |
| 6,898,505 B2 * | 5/2005 | Kadota et al. ................. 701/71 |
| 2004/0064233 A1* | 4/2004 | Iida ............................... 701/69 |
| 2004/0116247 A1* | 6/2004 | Wakamatsu ................... 477/86 |

FOREIGN PATENT DOCUMENTS

| | | |
|---|---|---|
| EP | 1 127 726 A2 | 8/2001 |
| JP | 63-176729 | 7/1988 |
| JP | 8-2278 | 1/1996 |
| JP | 2000-25476 | 1/2000 |

\* cited by examiner

*Primary Examiner*—Lesley D. Morris
*Assistant Examiner*—Daniel Yeagley
(74) *Attorney, Agent, or Firm*—Oblon, Spivak, McClelland, Maier & Neustadt, P.C.

(57) ABSTRACT

Front and rear wheels Tf, Tr of a motor vehicle driven by an engine 10 are connected through a differential control device 15 which is capable of varying the torque to transmit. When the turning radius of a predetermined one wheel or the motor vehicle is equal to or smaller than a predetermined turning radius, the transmission torque of the differential control device is decreased by a control device to prevent the tight-corner braking phenomenon from occurring. When the motor vehicle is stopped momentarily with the transmission torque being lowered, the control device maintains the transmission torque as it is, and the vehicle is then restarted with the transmission torque being lowered. Thus, when the motor vehicle which was stopped momentarily with a large steering angle is then restarted, the tight-corner braking phenomenon can be prevented from occurring from the beginning of the restarting.

14 Claims, 5 Drawing Sheets

DRIVE POWER TRANSMISSION EQUIPMENT

TECHNOLOGICAL FILED

The present invention relates to a drive power transmission device capable of preventing a tight-corner braking phenomenon from occurring when the turning radius is small in a four-wheel drive vehicle.

BACKGROUND ART

In motor vehicles, during the traveling along a curve, the turning radiuses of front wheels become larger than those of rear wheels, so that the traveling distance of the front wheels become longer than those of the rear wheels. For this reason, in a four-wheel drive vehicle of the type that front and rear wheels are drivingly connected to be driven by an engine, a problem arises in that since the difference between the traveling distances of the front and rear wheels becomes large during the traveling along a curve with a small radius, a tight-corner braking phenomenon to act as if braking has been applied to the front wheels occurs to exert an adverse influence on the steerability. As measures to obviate the problem, there is known a technology which is disclosed in Japanese unexamined, published patent application No. 8-2278. This technology is to prevent the occurrence of the tight-corner braking phenomenon in the following way. That is, the wheel speeds of four wheels are detected by wheel speed sensors, and then, the speed difference is calculated between the outside front wheel and the inside rear wheel. When the speed difference is equal to or larger than a judgment value which corresponds to a speed difference made on a curve with a turning radius causing the tight-corner braking to occur and when the speed difference is smaller than another judgment value which corresponds to another speed difference made on a curve with the minimum turning radius, the motor vehicle is judged to be in a turning state with a large steering angle, so that the transmission torque of a limited differential clutch (serving as differential control device) for coupling the front and rear wheels is decreased to prevent the occurrence of the tight-corner phenomenon.

Figure 7:
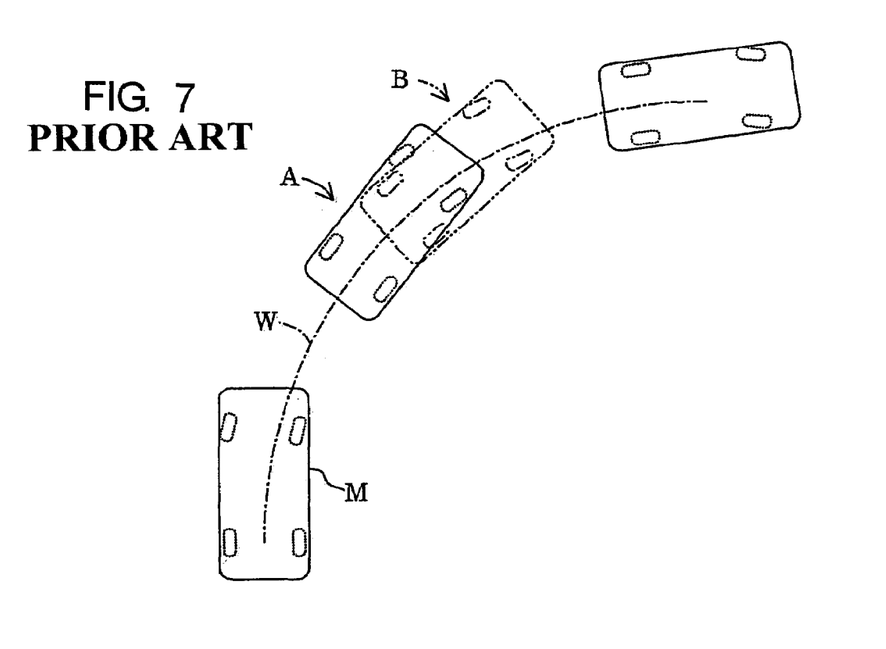
FIG. 7 is an explanatory view corresponding to that shown in FIG. 6 but illustrating the movement of a motor vehicle provided with a drive power transmission device in the prior art.

However, the foregoing technology involves the following problems. That is, as shown in FIG. 7, when the motor vehicle M which was traveling along a curve with a turning radius equal to or smaller than a turning radius (hereafter simply as "tight-corner turning radius) which causes the tight-corner braking phenomenon to occur, is stopped temporarily at a position (A) and then is restarted, the tight-corner braking phenomenon occurs to adversely influence the steerability until the motor vehicle reaches another position (B) advanced somewhat from the stop position (A). Further, the motor vehicle suffers a shock when the tight-corner braking phenomenon is released at the position (B).

The causes for this are explained as follows. The rotational speeds of the wheels detected by the wheel speed sensors decrease to zero when the motor vehicle is stopped temporarily at the position (A), and since the judgment that the vehicle is in a turning state along a curve with a radius smaller than the tight-corner turning radius is reversed, the transmission torque of the differential control device is increased to bring the front and rear wheels into direct connection. Accordingly, by detecting the rotational speeds of the wheels by the wheel speed sensors after the restarting and then by calculating the speed difference between the outside front wheel and the inside rear wheel, it is judged that the vehicle is turning with a large steering angle to travel along a curve of a smaller radius than the tight-corner turning radius, and until so judged, the tight-corner braking phenomenon occurs to accumulate its stress in a power transmission mechanism between the front and rear wheels due to the competing rotations of the front and rear wheels depending on the difference between the traveling distances. Then, since it is judged at the position (B) that the vehicle is turning with a large steering angle along a curve of a smaller radius than the tight-corner turning radius, the transmission torque of the differential control device is decreased to release the tight-corner baking phenomenon. At this time, the stress accumulated in the power transmission mechanism is released instantaneously, so that the shock is given. This problem occurs not only when the motor vehicle M is restarted after being stopped temporarily, but also when the vehicle speed is increased again after being lowered to decrease the wheel speeds of the respective wheels to lower speeds than those which cannot be detected by the wheel speed sensors.

The object of the present invention is to solve the aforementioned various problems by performing a control of preventing the tight-corner braking phenomenon from occurring from the beginning of a restarting when the vehicle is restarted after being stopped temporarily in a control state that the occurrence of the tight-corner braking phenomenon is being prevented by decreasing the transmission torque of a differential control device for coupling front and rear wheels.

DISCLOSURE OF THE INVENTION

The present invention resides in a drive power transmission device provided with a differential control device for distributing the transmission torque from an engine to front and rear wheels, the differential control device being capable of varying the torque distribution ratio between the front and rear wheels, and with a control device for executing a tight-corner braking prevention control under which the transmission torque of the differential control device to the front wheels or the rear wheels are decreased so as to prevent the tight-corner braking phenomenon from occurring when the turning radius of a predetermined one wheel of the wheels or the vehicle is equal to or smaller than a predetermined turning radius. The control device is constructed so that when the vehicle under the tight-corner braking prevention control being executed is restarted after being stopped momentarily or is accelerated from a lower vehicle speed than a predetermined vehicle speed to a higher vehicle speed than the predetermined vehicle speed, the control device executes the tight-corner braking prevention control from the beginning of the restarting or the acceleration.

Therefore, according to the present invention, since the control device is constructed so that when the vehicle under the tight-corner braking prevention control being executed is restarted after being stopped momentarily or is accelerated from a lower vehicle speed than the predetermined vehicle speed to a higher vehicle speed than the predetermined vehicle speed, the control device executes the tight-corner braking prevention control from the beginning of the restarting or the acceleration, the tight-corner braking phenomenon does not occur to give an influence on the steerability after the restarting or the commencement of the acceleration toward the predetermined vehicle speed or higher. Further, since stress is not accumulated in a power transmission mechanism between the front and rear wheels, any shock which may otherwise be given upon the release of such stress is not given.

Further, the present invention resides in the drive power transmission device improved as mentioned above, wherein when the vehicle is in the state that it is stopped or the vehicle speed is equal to or lower than the predetermined vehicle speed, the control device makes a tight-corner flag for determining whether to execute the tight-corner braking prevention control or not, remain in the state that the tight-corner flag was right before the stopping or right before the vehicle speed is decreased to the predetermined vehicle speed or lower. Thus, since the control device is not required to execute any special operation but to make the tight-corner flag remain in the state that the tight-corner flag was right before the stopping or right before the vehicle speed is decreased to the predetermined vehicle speed or lower, the control device can execute accurate control in a simplified construction.

Furthermore, the present invention resides in the drive power transmission device improved as mentioned above, wherein the motor vehicle is further provided with wheel speed sensors for detecting the rotational speeds of at least one pair of right and left wheels of the front and rear wheels. The control device executes the tight-corner braking prevention control when the turning radius of the predetermined one wheel or of the vehicle, which is calculated based on the rotational speed difference between the right and left wheels detected by the wheel speed sensors, is equal to or smaller than the predetermined turning radius. With this configuration, since the wheel speed sensors can be substituted by those wheel sensors for antiskid brake systems as provided in most of the motor vehicles, the increase in the manufacturing cost in practicing the present invention becomes small.

Where the turning radius of the predetermined one wheel or the vehicle is calculated based on the rotational speed difference between right and left wheels, the slip of each wheel on the road surface causes the calculated turning radius to involve some errors. Therefore, a problem arises in that the tight-corner braking prevention control cannot be executed reliably by the use of the turning radius involving some such errors.

In order to obviate this problem, the present invention resides in the drive power transmission device improved as mentioned above, wherein the motor vehicle is further provided with wheel speed sensors for respectively detecting the rotational speeds of the right and left front and rear wheels. The control device includes first turning radius calculation means for calculating the turning radius of the predetermined one wheel or the motor vehicle based on the rotational speed difference between either one pair of the right and left wheels of the front and rear wheels, and second turning radius calculation means for calculating the turning radius of the predetermined one wheel or the motor vehicle based on the rotational speed difference between the other pair of the right and left wheels of the front and rear wheels or based on the rotational speed difference between each one pair of the right and left wheels of the front and rear wheels. And, the control device executes the tight-corner braking prevention control when the difference between the turning radiuses which are calculated respectively by the first and second turning radius calculation means is equal to or smaller than a predetermined value and when at least any one of the turning radiuses which are calculated respectively by the first and second turning radius calculation means is equal to or smaller than the predetermined turning radius.

With this construction, of the calculated turning radiuses, there is used one obtained when the difference between the two turning radiuses calculated by the two turning radius calculation means exceeds a predetermined value, that is, there is used one turning radius which is left by eliminating the other turning radius which is larger in the foregoing slip and hence, larger in error. Therefore, it can be realized to execute precise tight-corner braking prevention control.

When the motor vehicle under the tight-corner braking prevention control being executed is restarted after being stopped momentarily or is accelerated from a lower vehicle speed than the predetermined speed to a higher vehicle speed than the predetermined speed, the drive wheels may slip because the friction coefficient ($\mu$) of the road surface is small. In this case, the execution of the tight-corner braking prevention control has caused the differential control device to distribute the drive power to the secondary drive wheels at a small transmission torque distribution rate, and therefore, it may be the case that the motor vehicle cannot be started due to the lack of the drive power at the side of the secondary drive wheels.

In order to solve this problem, the present invention resides in the drive power transmission device improved as mentioned above, wherein the control device is further provided with slip judging means for judging whether or not the drive wheels are slipping when the motor vehicle under the tight-corner braking prevention control being executed is restarted after being stopped momentarily or is accelerated from a lower vehicle speed than the predetermined speed to a higher vehicle speed than the predetermined speed. And, the control device discontinues the execution of the tight-corner braking prevention control when the slip judging means judges that the slip is occurring.

Therefore, when the motor vehicle is restarted after being stopped momentarily or is accelerated from the state that the vehicle speed is equal to or lower than the predetermined value, the drive wheels may slip because the friction coefficient ($\mu$) of the road surface is small, in which case, the motor vehicle is returned from under the tight-corner braking prevention control to under an ordinary control, so that the transmission torque is distributed also to the secondary drive wheels to enable the vehicle to be restarted.

Further, the present invention resides in the drive power transmission device improved as mentioned above, wherein the slip judgment means judges that the slip is occurring when the rotational speed of any one of the drive wheels is equal to or higher than a first threshold value and when the rotational speed of any one of the secondary drive wheels is equal to or lower than a second threshold value. Thus, the occurrence of the slip can be judged correctly.

PREFERRED EMBODIMENT TO PRACTICE THE INVENTION

Hereinafter, an embodiment of a drive power transmission device for practicing the present invention will be described with reference to the drawings. As shown mainly in FIG. 1, the drive power transmission device according to this embodiment is composed of a differential control device 15 capable of varying the transmission torque for connecting front wheels Tf and rear wheels Tr of a motor vehicle M driven by an engine 10, and an electronic controller (control device) 20 for controlling the transmission torque of the differential control device 15. The drive power from the engine 10 is transmitted to a transfer 12 through a transaxle 11 incorporating a transmission therein, and at the transfer 12, the drive power distributed to the front wheel side is transmitted to right and left front wheels Tf as drive wheels through a front differential (not shown), while the drive power distributed to the rear wheel side is transmitted to right and left rear wheels Tr as secondary drive wheels through a propeller shaft 13 provided with the differential control device 15 at mid position thereof as well as through a rear differential 14. The differential control device 15 is a multi-plate friction clutch of electromagnetic or hydraulic type and is capable of varying the transmission torque in dependence on a control output from the electronic control device 20. Wheel speed sensors S1, S2, S3 and S4 for detecting the rotational speeds are provided respectively in association with right and left front wheels Tf and right and left rear wheels Tr.

Figure 1:
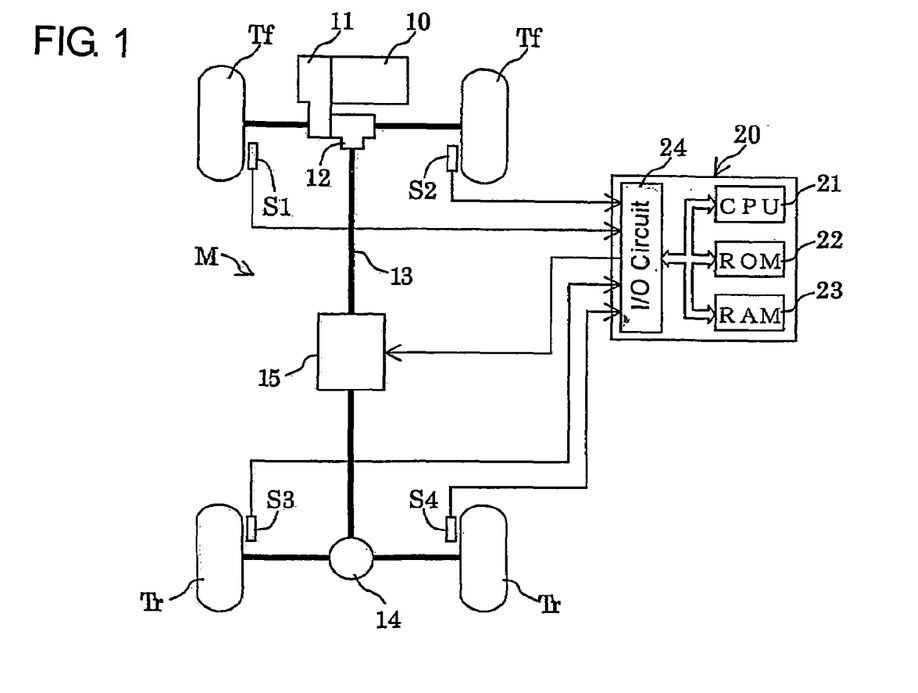
FIG. 1 is an explanatory view showing the general construction of a drive power transmission device in one embodiment according to the present invention.

The electronic control device 20 is provided with a CPU 21 for calculating a control value of the engaging force which value is to be output to the differential control device 15 in dependence on the traveling state of the motor vehicle M, a ROM 22 having stored control programs which are necessary for such calculation and outputting, a RAM 23 used as a working area for such calculation, and an input/output circuit 24 for performing outputting and inputting to and from each of the differential control device 15 and the wheel speed sensors S1, S2, S3, S4. The CPU 21 of the electronic control device 20 calculates the turning radius of any of the wheels or the motor vehicle M based on the rotational speeds of the wheels Tf1, Tf2, Tr1, Tr2 which are detected by the wheel speed sensors S1, S2, S3, S4 and judges whether or not the calculated turning radius is equal to or smaller than a predetermined tight-corner turning radius. The CPU 21 then executes an ordinary control under which the engaging force of the differential control device 15 is increased thereby to increase the transmission torque, unless the calculated turning radius is equal to or smaller than the tight-corner turning radius, but executes a tight-corner braking prevention control under which the engaging force of the differential control device 15 is weakened thereby to decrease the transmission torque, if the calculated turning radius is equal to or smaller than the tight-corner turning radius.

Figure 2:
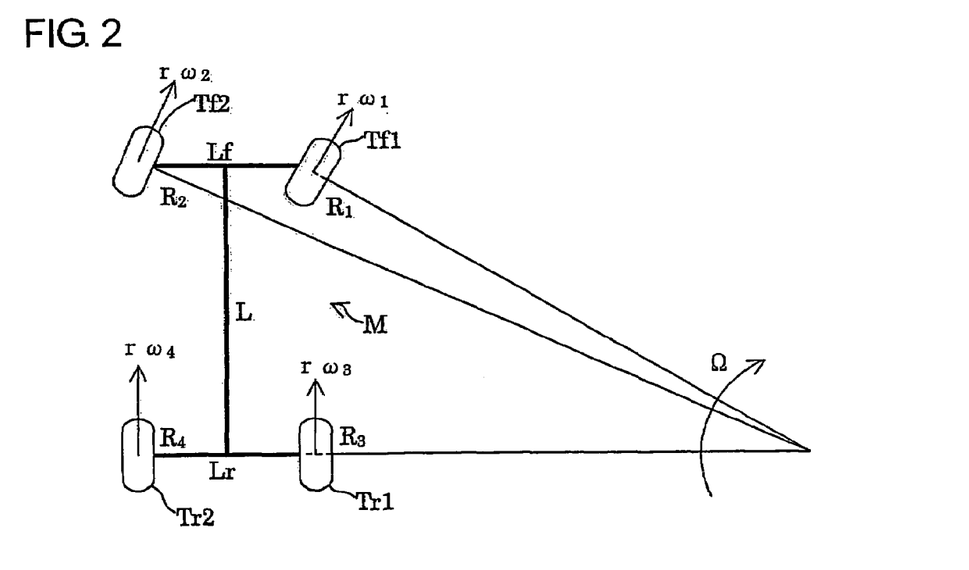
FIG. 2 is an explanatory view for deriving calculation expressions for turning radiuses in the embodiment shown in FIG. 1.

To start with, calculation expressions for calculating the turning radiuses based on the wheel rotational speeds detected by the wheel speed sensors S1, S2, S3, S4 will be explained with reference to FIG. 2. First, various symbols are defined as follows:

L: Wheel Base
Lf: Front Tread
Lr: Rear Tread
r: Radius of wheels Tf, Tr
$\Omega$: Turning Speed of Motor Vehicle M
$R_1, \omega_1$: Turning Radius and Rotational Speed of Inside Front Wheel Tf1
$R_2, \omega_2$: Turning Radius and Rotational Speed of Outside Front Wheel Tf2
$R_3, \omega_3$: Turning Radius and Rotational Speed of inside Rear Wheel Tr1
$R_4, \omega_4$: Turning Radius and Rotational Speed of outside Rear Wheel Tr2

Calculated in this embodiment are the turning radius R3 of the insider rear wheel Tr1 which is derived from the rotational speeds of the right and left rear wheels Tr and the turning radius R3' of the inside rear wheel Tr1 which is derived from the rotational speeds of the right and left front wheels Tf and the right and left rear wheels Tr. The reason for this will be described hereafter. It is to be noted that the turning radiuses R3 and R3' calculated herein represent those values obtained in the case that any of the wheels is not slipping.

Description will be made concerning the calculation procedure for the turning radius $R_3$ of the inside rear wheel Tr1 which is based on the rotational speeds of the right and left rear wheels Tr. First, the following expression 1 holds true between the turning speed $\omega$ of the motor vehicle M and the rotational speed $\omega_1, \omega_2, \omega_3, \omega_4$ of each wheel.

$$R_1\Omega=r\omega_1$$

$$R_2\Omega=r\omega_2$$

$$R_3\Omega=r\omega_3$$

$$R_4\Omega=r\omega_4 \quad \text{(Expression 1)}$$

This derives the following expression 2.

$$R_1/\omega_1=R_2/\omega_2=R_3/\omega_3=R_4/\omega_4 \quad \text{(Expression 2)}$$

Further, the following expression 3 holds true among the turning radius $R_3$ of the inner rear wheel Tr1, the turning radius $R_4$ of the outside rear wheel Tr2 and the rear tread Lr.

$$R_4=R_3+Lr \quad \text{(Expression 3)}$$

The following expression 4 for calculating the turning radius $R_3$ of the inside rear wheel Tr1 can be derived from this expression 3 and the foregoing expression 2.

$$R_3=Lr/\{(\omega_4/\omega_3)-1\} \quad \text{(Expression 4)}$$

Next, description will be made with respect to the calculation procedure for the turning radius $R_3'$ of the inside rear wheel Tr1 which is based on the rotational speeds of the right and left front wheels Tf and the right and left rear wheels Tr. Since the front tread Lf between the right and left front wheels Tf is approximately the same as the rear tread Lr between the right and left rear wheels Tr, the following expression 5 holds true.

$$R_1{}^2=R_3{}^2+L^2$$

$$R_2{}^2=R_4{}^2+L^2 \quad \text{(Expression 5)}$$

The following expression 6 for calculating the turning radius $R_3'$ of the inside rear wheel Tr1 can be derived from this expression 5 and the foregoing expression 2.

$$R_3'^2 = \{1-(\omega_2/\omega_1)^2\}L^2/\{(\omega^2/\omega_1)^2-(\omega_4/\omega_3)^2\} \quad \text{(Expression 6)}$$

As mentioned earlier, the two turning radiuses $R_3$ and $R_3'$ which are calculated based on the rotational speeds of the right and left front and rear wheels Tf, Tr are those values obtained when any of the wheels Tf, Tr is not slipping on the road surface and hence, ought to become the same with each other. However, they take a smaller value than the actual turning radius when the outside front and rear wheels Tf2 and Tr2 are slipping on mud or mire, but take a larger value than the actual turning radius (or take the value obtained in the case of a reverse curve) when the inside front and rear wheels Tf1 and Tr1 are slipping on mud or mire. In either of these cases, it results that the detected turning radius includes an error. Since, with any of the wheels slipping, the slip rates of the wheels do not have the same values with one another, the two turning radiuses $R_3$ and $R_3'$ become different values. Accordingly, by comparing the two turning radiuses $R_3$ and $R_3'$ with each other, it becomes possible to detect whether or not the error involved in the detected turning radius $R_3$ has exceeded a tolerable error due to the slipping of the wheels Tf, Tr on the road surface.

Figure 4:
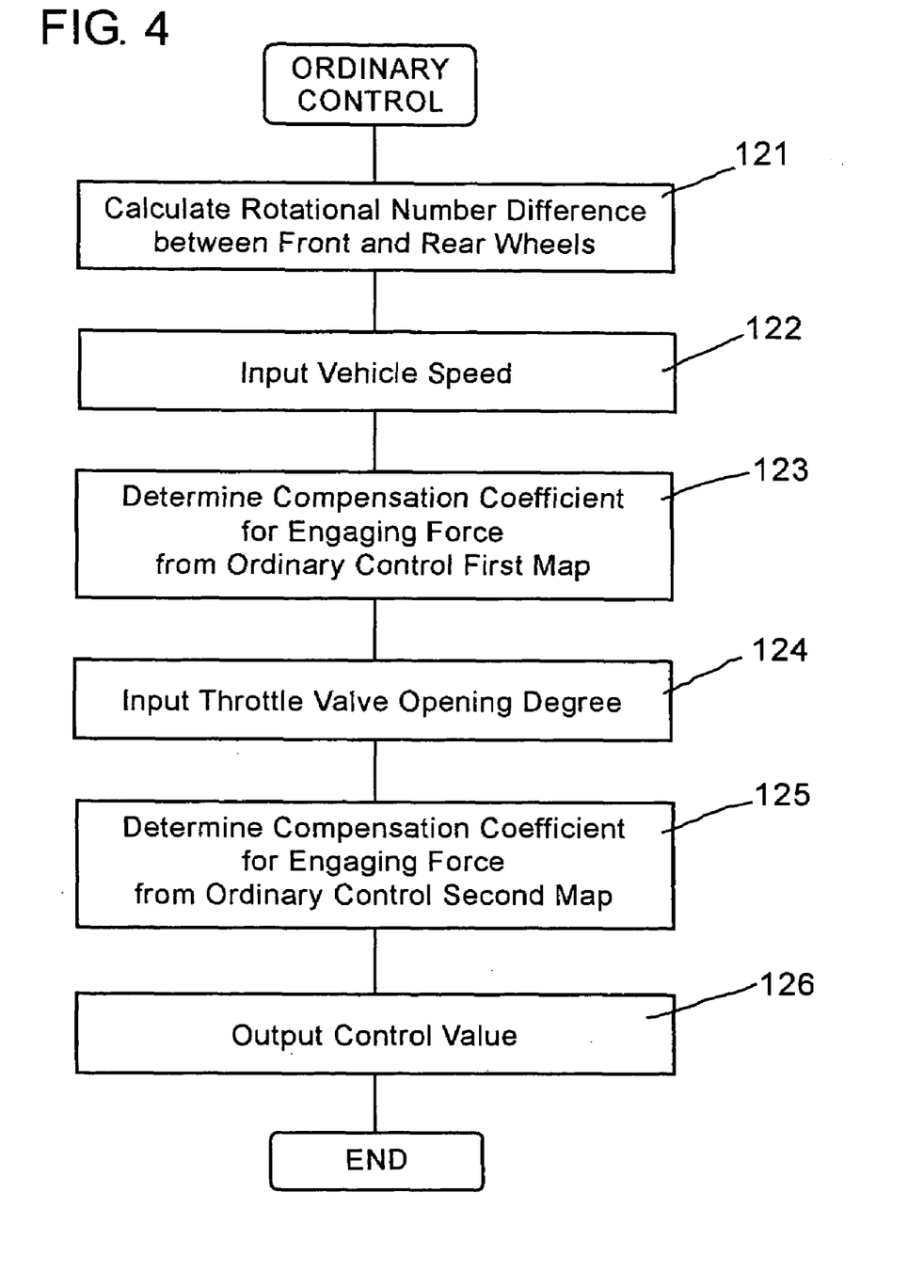
FIG. 4 is a flowchart of a subroutine for an ordinary control in the flowchart shown in FIG. 3.
Figure 5:
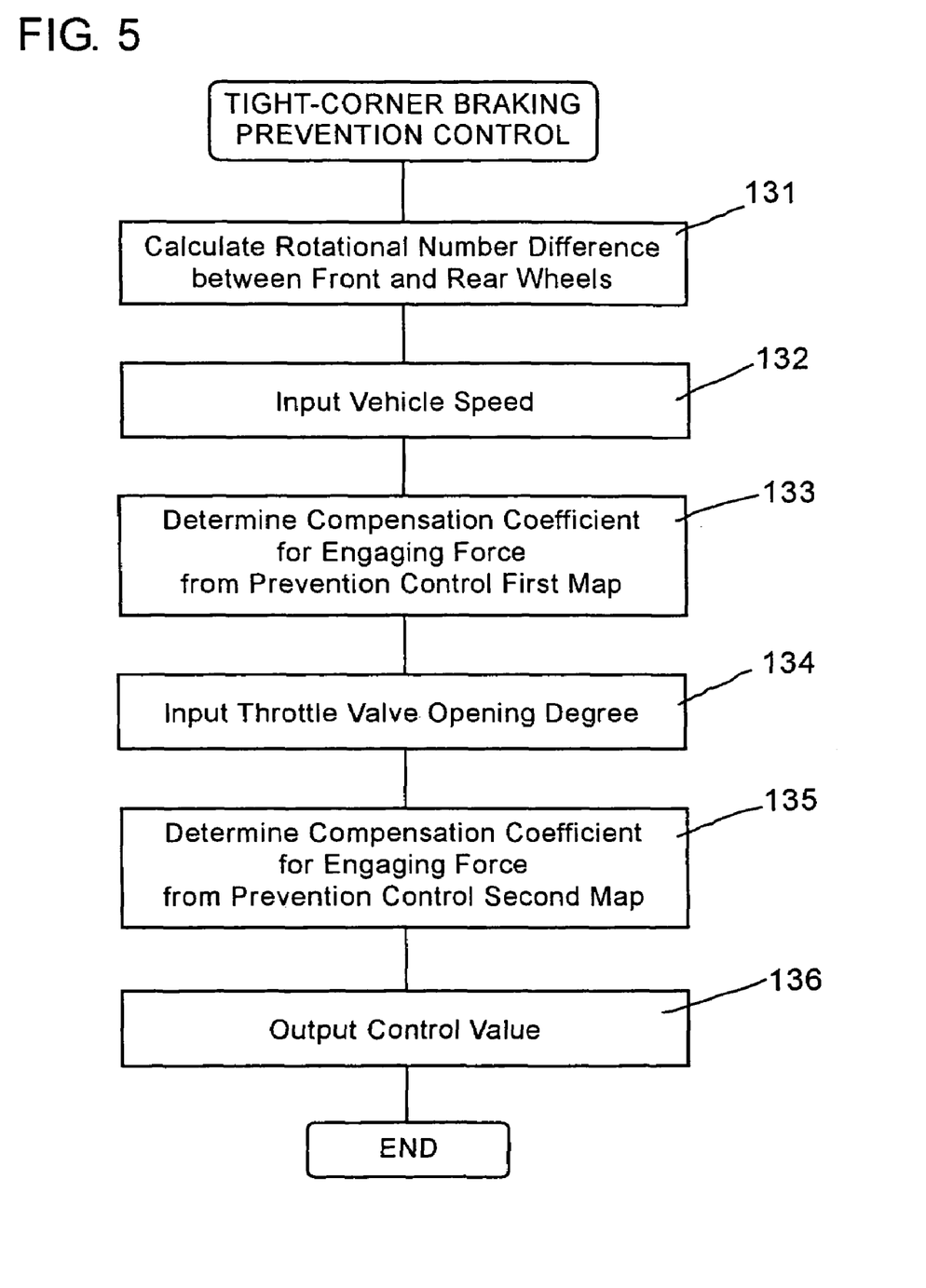
FIG. 5 is a flowchart of a subroutine for a tight-corner braking prevention control in the flowchart shown in FIG. 3.

Next, detecting the tight-corner braking phenomenon and controlling the engaging force of the differential control device 15 will be described with reference to flowcharts shown in FIGS. 3 through 5. The CPU 21 of the electronic control device 20 executes the flowchart shown in FIG. 3 at predetermined short time intervals. The CPU 21 first takes thereinto the rotational speeds $\omega_1$, $\omega_2$, $\omega_3$, $\omega_4$ of the right and left front and rear wheels Tf, Tr from the wheel speed sensors S1, S2, S3, S4 (step 100) and judges whether or not any of the rotational speeds $\omega_1$, $\omega_2$, $\omega_3$, $\omega_4$ is zero, that is, whether or not the motor vehicle M is traveling (step 101). When any of the rotational speeds $\omega_1$, $\omega_2$, $\omega_3$, $\omega_4$ is not zero because the motor vehicle M is traveling, the CPU 21 advances its control operation to step 102. It is to be noted that at step 101, instead of judging whether or not any of the rotational speeds $\omega_1$, $\omega_2$, $\omega_3$, $\omega_4$ is zero, a judgment may be executed of whether or not all the rotational speeds $\omega_1$, $\omega_2$ $\omega_3$, $\omega_4$ are larger than a predetermined value $\delta$ which is the slowest rotational speed detectable by the wheel speed sensors. By the foregoing expression 4, the turning radius $R_3$ of the inside rear wheel Tr1 is calculated based on the rotational speeds $\omega_3$, $\omega_4$ of the right and left rear wheels Tr (step 102), and it is judged whether or not the absolute value of the turning radius $R_3$ is equal to or smaller than a predetermined turning radius a, i.e., tight-corner turning radius (step 103). When the turning radius $R_3$ is equal to or smaller than the tight-corner turning radius $\alpha$, the CPU 21 advances its control operation to step 104, at which by the foregoing expression 6, it calculates the turning radius $R_3'^2$ of the inside rear wheel Tr1 based on the rotational speeds $\omega_1$, $\omega_2$, $\omega_3$, $\omega_4$ of the right and left front and rear wheels Tf, Tr. Then, the CPU 21 advances its control operation to step 105, at which it judges whether or not the absolute value of the subtraction $R_3^{2-R_3'^2}$ is equal to or smaller than another predetermined value $\beta$. The predetermined value $\beta$ is set so that the error of the detected turning radius $R_3$ from the actual turning radius of the inside rear wheel Tr1 does not exceed a tolerable value. If the absolute value of the subtraction $R_3^2-R_3'^2$ is equal to or smaller than the predetermined value $\beta$, the CPU 21 sets the tight-corner flag at step 106. Thereafter, the CPU 21 at step 110 judges whether or not the tight-corner flag has been set. In this case, since it has been set, the CPU 21 executes a tight-corner braking prevention control (step 130) as referred to later in detail and terminates the control operations according to the flowchart shown in FIG. 3. As mentioned above, the CPU 21 sets the tight-corner flag and executes the tight-corner braking prevention control when the calculated turning radius $R_3$ is equal to or smaller than the tight-corner turning radius a and when the absolute value of the subtraction $R_3^2-R_3'^2$ is equal to or smaller than the predetermined value $\beta$, that is, when the error of the turning radius $R_3$ is equal to or smaller than the tolerable value.

When the turning radius $R_3$ is not equal to nor smaller than the tight-corner turning radius $\alpha$ at step 103, or when the absolute value of the subtraction $R_3^2-R_3'^2$ is not equal to nor smaller than the predetermined value $\beta$, the CPU 21 advances its control operation to step 107 to clear the tight-corner flag, and judges at step 110 whether or not the tight-corner flag has been set. In this case, since it has not been set, the CPU 21 executes an ordinary control (step 120) as referred to later in detail and terminates the control operations according to the flowchart shown in FIG. 3. In short, when the calculated turning radius $R_3$ is not equal to nor smaller than the tight-corner turning radius $\alpha$, or when the error of the turning radius $R_3$ is not equal to nor smaller than the tolerable value, the CPU 21 clears the tight-corner flag and executes the ordinary control.

When any one of the rotational speeds $\omega_1$-$\omega_4$ is judged to be zero or smaller than a predetermined value $\delta$ at step 101 because the motor vehicle M has been stopped or substantially stopped, and when the drive wheels are judged at step 108 to be not slipping, the CPU 21 skips its control operation up to step 110 without changing the state of the tight-corner flag which was held when the control cycle at that interval began to be executed, and executes the tight-corner braking prevention control (step 120) or the ordinary control (step 110) in dependence upon the state of the tight-corner flag which remains at that moment. Accordingly, when the motor vehicle M under the tight-corner braking prevention control being executed is restarted after being stopped momentarily or is accelerated from a lower speed than the predetermined value to a higher speed than the same, it becomes possible to execute the tight-corner braking prevention control from the beginning of the restarting or the acceleration.

In the state that the tight-corner braking prevention control is being executed, the motor vehicle M is restarted after being stopped momentarily or the motor vehicle M is accelerated from the state that any of the wheel speeds is lowered than the predetermined value $\delta$. In either case, the drive wheels slip if the friction coefficient ($\mu$) of the road surface is small. In this case, when it is judged at step 101 that the rotational speeds of the secondary drive wheels are zero or smaller than the predetermined value $\delta$, and then when it is judged at step 108 constituting slip judging means that the drive wheels are slipping, the tight-corner flag is cleared at step 109. Therefore, if the drive wheels slip due to the friction coefficient ($\mu$) of the road surface being small when the vehicle is restarted after being stopped momentarily or is accelerated from the state that any of the wheel speeds is decreased to the predetermined value $\delta$ or lower, the tight-corner braking prevention control is discontinued to be returned to the ordinary control, whereby the motor vehicle M can be restarted with the secondary drive wheels being also given a sufficient transmission torque.

Where the motor vehicle M is started from the stop state as it makes turn along a curve of the minimum turning radius without slipping, the rotational speed of the outside front wheel as drive wheel becomes the maximum value γ when the rotational speed of the inside rear wheel as secondary drive wheel decreases to the predetermined value δ which is the lowest rotational speed detectable by the wheel speed sensor therefor. Therefore, at step 108, in order to correctly judge whether or not the slipping has occurred, the slipping is judged to have occurred when the rotational speed $\omega_1$ or $\omega_2$ of any one of the drive wheels is equal to or higher than a first threshold value which is set larger than the maximum value γ and when the rotational speed $\omega_3$ or $\omega_4$ of any one of the secondary drive wheels is equal to or lower than a second threshold value which is set smaller than the predetermined value δ. Step 108 may be changed to judge that the slipping has occurred when the rotational speed difference between the drive wheels and the secondary drive wheels exceeds a predetermined value.

In a motor vehicle of the type that the drive power from the engine 10 is directly transmitted to the right and left rear wheels Tr, but to the right and left front wheels Tf through the differential control device 15, the rear wheels Tr work as the drive wheels and the front wheels Tf work as the secondary drive wheels. In this case, it is judged at step 108 that the slipping has occurred when the rotational speed $\omega_3$ or $\omega_4$ of any one of the drive wheels is equal to or higher than the first threshold value which is set larger than the maximum value γ and when the rotational speed $\omega_1$ or $\omega_2$ of any one of the secondary drive wheels is equal to or lower than the second threshold value which is set smaller than the predetermined value δ.

In connection with the claimed invention, of those control programs stored in the ROM 22, the part for executing the calculation at step 102 corresponds to the first turning radius calculation means, and the part for executing the calculation at step 104 corresponds to the second turning radius calculation means. Instead of calculating the turning radius $R_3$ of the inside rear wheel Tr1, the first and second turning radius calculation means may be modified to calculate the turning radiuses $R_4$, $R_1$, $R_2$ of the outside rear wheel Tr2 or the inside or outside front wheel Tf1 or Tf2, or may be modified to calculate the turning radius of the motor vehicle M itself. In either case, the tight-corner turning radius is set to correspond to the calculated turning radius in that case. Further, the first and second turning radius calculation means may be constituted to calculate the foregoing respective turning radiuses based on the rotational speeds of the different wheels. For example, the first turning radius calculation means may be constituted to calculate the turning radius based on the rotational speeds of the both front wheels Tf, while the second turning radius calculation means may be constituted to do so based on the rotational speed of the both rear wheels Tr. Alternatively, the first turning radius calculation means may be constituted to calculate the turning radius based on the rotational speeds of the both front wheels Tf and the both rear wheels Tr, while the second turning radius calculation means may be constituted to do so based on the rotational speed of the both front wheels Tf. In either case, as the slip of each wheel on the road surface increases, the difference increases between the respective turning radiuses which are calculated by the first and second turning radius calculation means.

Next, the ordinary control at step 120 will be described with reference to the subroutine shown in FIG. 4. In the beginning, the CPU 21 calculates the rotational number difference between the front wheels Tf and the rear wheels Tr based on the rotational speeds of the right and left front and rear wheels Tf, Tr which are received from the wheel speed sensors S1, S2, S3, S4 (step 121) and then, calculates the vehicle speed from the average of the rotational speeds of the rear wheels Tr as the secondary drive wheels (step 122). Compensation coefficients for engaging forces each to be given to the differential control device 15 under the ordinary control have been set in correspondence to the rotational number differences as well as to the vehicle speeds and have been stored in the ROM 22 in the form of an ordinary control first map. A compensation coefficient for an engaging force which corresponds to a calculated rotational number difference and a calculated vehicle speed is read out from the ordinary control first map to be determined (step 123). In the case that the rotational number difference is large with the vehicle speed being low, it is judged that the wheels are slipping on mud, mire or the like. Therefore, the compensation coefficient in this case has been set to strengthen the engaging force in proportion to the increase in the rotational number difference in order to heighten the traction performance for enabling the vehicle to escape from a bad road such as mud, mire or the like, but has been set to weaken the engaging force in the case that the vehicle speed is high.

Subsequently, the CPU 21 receives a throttle valve opening degree from a throttle valve opening degree sensor attached to a throttle valve of the engine 10 (step 124). Compensation coefficients for engaging forces each to be given to the differential control device 15 under the ordinary control have been set in correspondence to throttle valve opening degrees and vehicle speeds and have been stored in the ROM 22 in the form of an ordinary control second map. A compensation coefficient for the engaging force which corresponds to the input throttle valve opening degree and the input vehicle speed is read out from the ordinary control second map to be determined (step 125). In order to heighten the starting performance and the acceleration performance, the compensation coefficients for the engaging forces in this case have been set to increase the engaging force as the throttle valve opening degree becomes large with the vehicle speed being low. Further, based on the compensation coefficient determined at steps 123, 125, the CPU 21 determines a control value for giving the differential control device 15 an appropriate engaging force under the ordinary control and outputs the determined control value to the differential control device 15 (step 126), whereby the transmission torque of the differential control device 15 can be controlled to control the torque distribution ratio between the front wheels Tf and the rear wheels Tr.

Next, the tight-corner braking prevention control at step 130 will be described with reference to the subroutine shown in FIG. 5. First, the CPU 21 calculates the rotational number difference between the front wheels Tf and the rear wheels Tr based on the rotational speeds of the right and left front and rear wheels Tf, Tr which are input from the wheel speed sensors S1, S2, S3, S4 (step 131), and then, calculates the vehicle speed from the average in rotational speeds of the rear wheels Tr as the secondary drive wheels (step 132). Compensation coefficients for the engaging forces to be given to the differential control device 15 under the tight-corner braking prevention control have been set in correspondence to the rotational number differences and the vehicle speeds and have been stored in the ROM 22 in the form of a tight-corner braking prevention control first map. Thus, a compensation coefficient for the engaging force which corresponds to the calculated rotational number difference and the calculated vehicle speed is read out from the tight-corner braking prevention control first map to be determined (step 133). In order to prevent the tight-corner braking from occurring, the compensation coefficients for this case are set to be smaller than those for the ordinary control so that the transmission torque to be transmitted to the rear wheels Tr as the secondary wheels are made small. The general characteristic or inclination with which the compensation coefficients are set is such that the engaging force is strengthened as the rotational number difference between the front and rear wheels increases with the vehicle speed being low, but is weakened to enhance the steerability as the vehicle speed increases, and the general inclination is the same as that for the ordinary control.

Then, the CPU 21 receives the throttle valve opening degree input from the throttle valve opening degree sensor which is attached to the throttle valve of the engine 10 (step 134). Compensation coefficients for the engaging forces to be given to the differential control device 15 under the tight-corner braking prevention control have been set in correspondence to the throttle valve opening degrees and the vehicle speeds and have been stored in the ROM 22 in the form of a tight-corner braking prevention control second map. Thus, a compensation coefficient for the engaging force which corresponds to the input throttle valve opening degree and the vehicle speed is read out from the tight-corner braking prevention control second map to be determined (step 135). In order to prevent the tight-corner braking from occurring, the compensation coefficients for this case are set to be smaller than those for the ordinary control. The general characteristic or inclination with which the compensation coefficients are set is such that the engaging force is strengthened as the throttle valve opening degree becomes large with the vehicle speed being low, and the general inclination is the same as that for the ordinary control. Thereafter, based on the compensation coefficients determined at the both steps 133, 135, the CPU 21 determines a control value for giving the differential control device 15 an appropriate engaging force which prevents the occurrence of the tight-corner braking and outputs the determined control value to the differential control device 15 (step 136), whereby the transmission torque of the differential control device 15 can be controlled to control the torque distribution ratio between the front wheels Tf and the rear wheels Tr.

Figure 6:
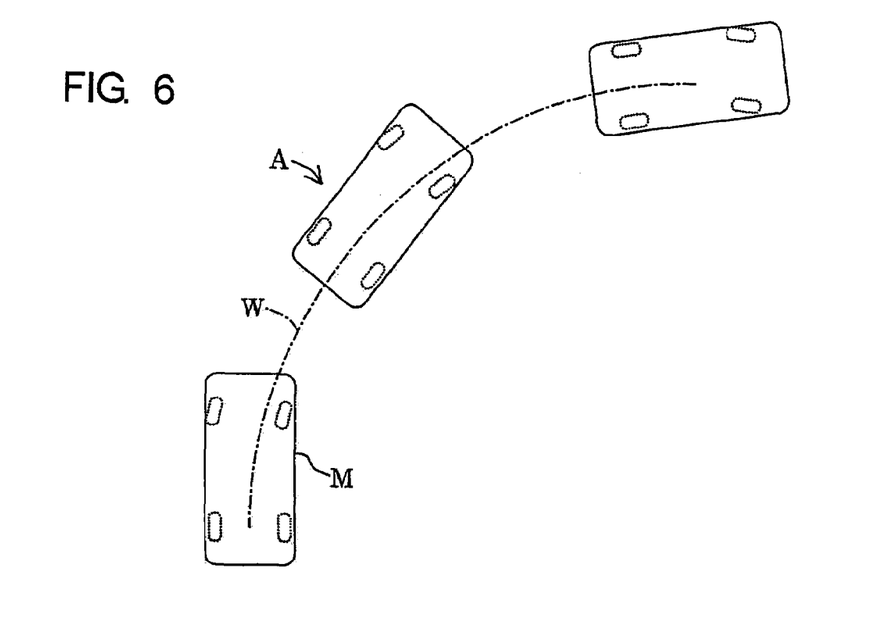
FIG. 6 is an explanatory view illustrating the movement of a motor vehicle provided with the drive-power transmission device in the embodiment shown in FIG. 1.

According to this embodiment, the tight-corner flag is kept set while the tight-corner braking control is executed because the turning radius R3 of the inside rear wheel Tr1 is equal to or smaller than the right-corner turning radius, and when the motor vehicle M is stopped or substantially stopped in this state, the tight-corner flag remains as it is without being cleared. Accordingly, when the motor vehicle M traveling along a curve W as shown in FIG. 6 is stopped temporarily at a position A and then is restarted or is accelerated from the state that any of the wheel speeds is decreased to be equal to or lower than the predetermined value δ, the tight-corner braking prevention control is executed to decrease the transmission torque of the differential control device 15 from right after the restarting or the acceleration. As a result, the tight-corner braking phenomenon does not occur after the restarting or the acceleration, so that any adverse influence is not exerted on the steerability. In addition, since no stress is accumulated in the power transmission mechanism between the front and rear wheels, it does not take place that the release of such stress gives rise to a shock.

Further, when the motor vehicle M under the tight-corner braking prevention control is stopped temporarily and then is restarted, or when the motor vehicle M under the tight-corner braking prevention control is accelerated from the state that any of the wheel speeds is decreased to the predetermined value δ or lower, the drive wheels may slip because the friction coefficient (μ) of the road surface is small. In this case, the tight-corner flag is cleared at step 109 if the rotational speeds of the secondary drive wheels are zero or equal to or lower than the predetermined value δ. As a consequence, in the case that the drive wheels slip because the friction coefficient (μ) of the road surface is small when the motor vehicle M is stopped temporarily and then is restarted or is accelerated from the state that any of the wheel speeds is decreased to the predetermined value δ or lower, the tight-corner braking prevention control is discontinued to be returned to the ordinary control, and a sufficient drive torque is distributed also to the secondary drive wheels, so that the motor vehicle M can be started.

Also in this embodiment, when the motor vehicle M is stopped or substantially stopped as mentioned earlier, the electronic control device 20 does nothing but to hold the tight-corner flag for determining whether to execute the tight-corner braking prevention control or not, in the state that the flag was right before the stopping, and is not needed to execute any other particular operation. Therefore, the electronic control device 20 is not complicated in construction.

Figure 3:
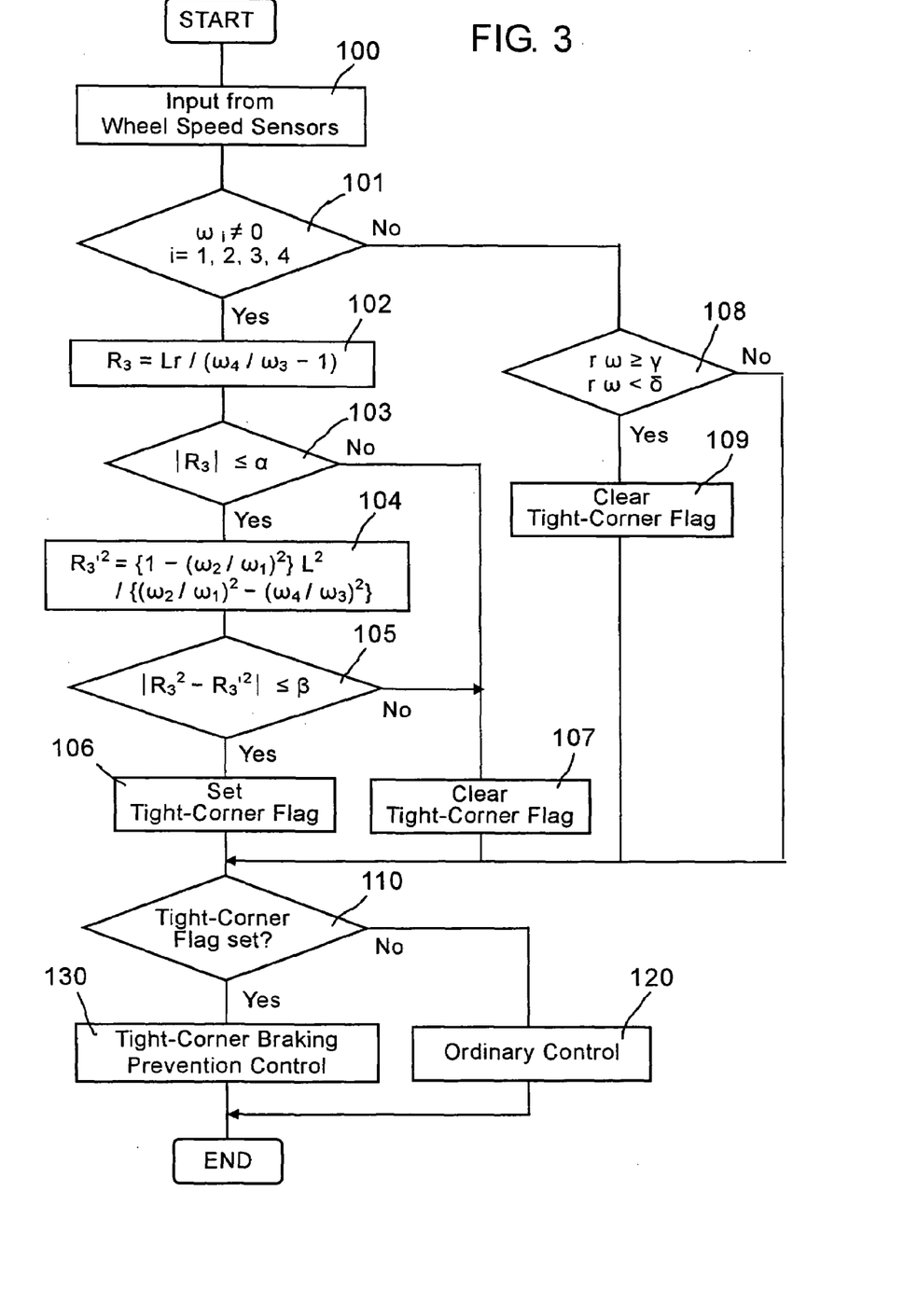
FIG. 3 is a flowchart of a control program in the embodiment shown in FIG. 1.

Moreover, in this embodiment, the CPU 21 of the electronic control device 20 calculates the two turning radiuses based on the rotational speeds of different wheels at step 102 and step 104 in the flowchart shown in FIG. 3, compares these turning radiuses, and executes the tight-corner braking prevention control by the use of the turning radius which is left by eliminating the other turning radius representing a larger slip and hence, a larger error as a result of such comparison. By doing so, it becomes realized that the tight-corner braking prevention control can be executed precisely. However, the present invention is not limited to this way of control and rather may be practiced in such a way as to calculate only one turning radius and to execute the tight-corner braking prevention control based on such one turning radius.

Also in this embodiment, description is directed to a four-wheel drive vehicle of the type that is not provided with any center differential. However, the present invention is applicable to a four-wheel drive vehicle of the type having such center differential, in which case the present invention may be practiced in such a form that the center differential is incorporated into, e.g., the transfer 12.

Additionally, the wheel speed sensors S1, S2, S3, S4 may be substituted by those wheel speed sensors which most of motor vehicles have for anti-skid brake systems. By doing so, the increase in the manufacturing cost for practicing the present invention becomes small. Further, the present invention may be practiced in such a form that the substances in calculation of the first turning radius calculation means and the second turning radius calculation means in the foregoing embodiment are exchanged with each other.

INDUSTRIAL APPLICABILITY

The drive power transmission device according to the present invention is suitable for use as a drive power transmission device for controlling the transmission torque distribution ratio between front and rear wheels through a differential control device so that the tight-corner braking phenomenon does not occur in a four-wheel drive vehicle of the type that the transmission torque from an engine is distributed to be transmitted to the front and rear wheels.

The invention claimed is:

1. A drive power transmission device comprising:
a differential control device configured to distribute transmission torque from an engine to front and rear wheels, the differential control device further configured to vary a torque distribution ratio between the front and rear wheels; and
a control device configured to execute a tight-corner braking prevention control under which the transmission torque of the differential control device to the front wheels or the rear wheels is decreased to prevent a tight-corner braking phenomenon from occurring when a turning radius of a predetermined one wheel of the wheels or a motor vehicle is equal to or smaller than a predetermined turning radius,
wherein the control device is further configured so that when the motor vehicle under the tight-corner braking prevention control being executed is restarted after being stopped momentarily or is accelerated to a higher speed than a predetermined vehicle speed from a lower speed than the predetermined vehicle speed, the control device executes the tight-corner braking prevention control from beginning of the restarting or the acceleration.

2. The drive power transmission device as set forth in claim 1,
wherein when the motor vehicle is in a state that the vehicle stopped or the vehicle speed is equal to or slower than the predetermined vehicle speed, the control device makes a tight-corner flag for determining whether to execute the tight-corner braking prevention control or not, remain in a state that the tight-corner flag was in right before the stopping or right before the vehicle speed became equal to or slower than the predetermined vehicle speed.

3. The drive power transmission device as set forth in claim 1,
wherein the motor vehicle is provided with wheel speed sensors configured to detect rotational speeds of at least one pair of right and left wheels of the front and rear wheels, and
wherein the control device executes the tight-corner braking prevention control when the turning radius of the predetermined one wheel or of the motor vehicle, which is calculated based on a rotational speed difference between the right and left wheels detected by the wheel speed sensors, is equal to or smaller than the predetermined turning radius.

4. The drive power transmission device as set forth in claim 1,
wherein the motor vehicle is provided with wheel speed sensors configured to detect rotational speeds of at least one pair of right and left wheels of the front and rear wheels, and
wherein the control device executes the tight-corner braking prevention control when the turning radius of the predetermined one wheel or of the motor vehicle, which is calculated based on a rotational speed difference between the right and left wheels detected by the wheel speed sensors, is equal to or smaller than the predetermined turning radius.

5. The drive power transmission device as set forth in claim 1, wherein the motor vehicle is provided with wheel speed sensors for respectively detecting rotational speeds of right and left wheels of the front and rear wheels,
wherein the control device includes first turning radius calculation means for calculating the turning radius of the predetermined one wheel or the motor vehicle based on a rotational speed difference between either one pair of right and left wheels of the front and rear wheels, and second turning radius calculation means for calculating the turning radius of the predetermined one wheel or the motor vehicle based on a rotational speed difference between the other pair of right and left wheels of the front and rear wheels or based on a rotational speed difference between each pair of right and left wheels of the front and rear wheels, and
wherein the control device executes the tight-corner braking prevention control when the difference between the turning radiuses that are calculated respectively by the first and second turning radius calculation means is equal to or smaller than a predetermined value and when at least any one of the turning radiuses that are calculated respectively by the first and second turning radius calculation means is equal to or smaller than the predetermined turning radius.

6. The drive power transmission device as set forth in claim 2, wherein the motor vehicle is provided with wheel speed sensors for respectively detecting rotational speeds of right and left wheels of the front and rear wheels,
wherein the control device includes first turning radius calculation means for calculating the turning radius of the predetermined one wheel or the motor vehicle based on a rotational speed difference between either one pair of right and left wheels of the front and rear wheels, and second turning radius calculation means for calculating the turning radius of the predetermined one wheel or the motor vehicle based on a rotational speed difference between the other pair of right and left wheels of the front and rear wheels or based on the rotational speed difference between each pair of right and left wheels of the front and rear wheels, and
wherein the control device executes the tight-corner braking prevention control when the difference between the turning radiuses that are calculated respectively by the first and second turning radius calculation means is equal to or smaller than a predetermined value and when at least any one of the turning radiuses that are calculated respectively by the first and second turning radius calculation means is equal to or smaller than the predetermined turning radius.

7. The drive power transmission device as set forth claim 1,
wherein the control device comprises means for judging whether or not drive wheels are slipping when the motor vehicle under the tight-corner braking prevention control being executed is restarted after being stopped momentarily or is accelerated from a lower speed than the predetermined vehicle speed to a higher speed than the predetermined vehicle speed, and
wherein the control device discontinues the execution of the tight-corner braking prevention control when the means for judging judges that the drive wheels are slipping.

8. The drive power transmission device as set forth claim 7,
wherein the means for judging judges that the slipping is occurring when the rotational speed of any one of the drive wheels is equal to or larger than a first threshold value and when the rotational speed of any one of secondary drive wheels is equal to or smaller than a second threshold value.

9. The drive power transmission device as set forth claim 2,
wherein the control device comprises means for judging whether or not drive wheels are slipping when the motor vehicle under the tight-corner braking prevention control being executed is restarted after being stopped momentarily or is accelerated from a lower speed than the predetermined speed to a higher speed than the predetermined speed, and
wherein the control device discontinues the execution of the tight-corner braking prevention control when the means for judging judges that the drive wheels are slipping.

10. The drive power transmission device as set forth claim 9, wherein the means for judging judges that the slipping is occurring when the rotational speed of any one of the drive wheels is equal to or larger than a first threshold value and when the rotational speed of any one of secondary drive wheels is equal to or smaller than a second threshold value.

11. The drive power transmission device as set forth claim 3,
wherein the control device comprises means for judging whether or not drive wheels are slipping when the motor vehicle under the tight-corner braking prevention control being executed is restarted after being stopped momentarily or is accelerated from a lower speed than the predetermined speed to a higher speed than the predetermined speed, and
wherein the control device discontinues the execution of the tight-corner braking prevention control when the means for judging judges that the drive wheels are slipping.

12. The drive power transmission device as set forth claim 11, wherein the means for judging judges that the slipping is occurring when the rotational speed of any one of the drive wheels is equal to or larger than a first threshold value and when the rotational speed of any one of secondary drive wheels is equal to or smaller than a second threshold value.

13. The drive power transmission device as set forth claim 4,
wherein the control device comprises means for judging whether or not drive wheels are slipping when the motor vehicle under the tight-corner braking prevention control being executed is restarted after being stopped momentarily or is accelerated from a lower speed than the predetermined speed to a higher speed than the predetermined speed, and
wherein the control device discontinues the execution of the tight-corner braking prevention control when the means for judging judges that the drive wheels are slipping.

14. The drive power transmission device as set forth claim 13,
wherein the means for judging judges that the slipping is occurring when the rotational speed of any one of the drive wheels is equal to or larger than a first threshold value and when the rotational speed of any one of secondary drive wheels is equal to or smaller than a second threshold value.

* * * * *